United States Patent
Döner

(10) Patent No.: US 11,601,199 B2
(45) Date of Patent: Mar. 7, 2023

(54) METHOD, DEVICE AND COMPUTER PROGRAM FOR TRANSMITTING AND OBTAINING NETWORK CREDENTIALS

(71) Applicant: Vestel Elektronik Sanayi ve Ticaret A.S., Manisa (TR)

(72) Inventor: Cagdas Döner, Manisa (TR)

(73) Assignee: VESTEL ELEKTRONIK SANAYI VE TICARET A.S., Manisa (TR)

(*) Notice: Subject to any disclaimer, the term of this patent is extended or adjusted under 35 U.S.C. 154(b) by 400 days.

(21) Appl. No.: 16/624,627

(22) PCT Filed: Dec. 27, 2017

(86) PCT No.: PCT/EP2017/084649
§ 371 (c)(1),
(2) Date: Dec. 19, 2019

(87) PCT Pub. No.: WO2018/233862
PCT Pub. Date: Dec. 27, 2018

(65) Prior Publication Data
US 2020/0137048 A1    Apr. 30, 2020

(30) Foreign Application Priority Data

Jun. 19, 2017 (EP) .................................. 17176710

(51) Int. Cl.
*H04B 10/116*    (2013.01)
*H04B 10/114*    (2013.01)
(Continued)

(52) U.S. Cl.
CPC ....... *H04B 10/116* (2013.01); *H04B 10/1141* (2013.01); *H04B 10/541* (2013.01);
(Continued)

(58) Field of Classification Search
CPC .............. H04B 10/1141; H04B 10/541; H04B 10/5563; H04L 63/0853; H04W 4/70
(Continued)

(56) References Cited

U.S. PATENT DOCUMENTS 9,301,141 B1 * 3/2016 Mincher ............. H04L 63/1433
9,596,708 B2    3/2017 Logue et al.
(Continued)

FOREIGN PATENT DOCUMENTS

DE    102018116500 A1 * 1/2020 ........... H04B 10/116
EP    1603289 A1    12/2005
(Continued)

OTHER PUBLICATIONS

Nguyen et al; AN SDN-based connectivity control system for Wi-Fi devices; 2018; Hindawi Wireless Communication and mobile computing; pp. 1-11. (Year: 2018).*
(Continued)

*Primary Examiner* — Amritbir K Sandhu
(74) *Attorney, Agent, or Firm* — J. Miguel Hernandez; James R. Gourley; Carstens, Allen & Gourley, LLP

(57) ABSTRACT

Arrangements for transmitting network credentials from a user device to a second device to enable the second device to connect to a network are disclosed. At the user device, a user inputs network credentials for the second device to enable the second device to connect to a network. The user device transmits modulated light to the second device. The light is modulated so that the transmitted light is encoded with the network credentials. The second device has a photo sensor for receiving the modulated light from the user device and a processor for processing the modulated light to obtain the network credentials from the received modulated light.

13 Claims, 2 Drawing Sheets

(51) Int. Cl.
*H04B 10/54* (2013.01)
*H04B 10/556* (2013.01)
*H04L 9/40* (2022.01)
*H04W 4/70* (2018.01)
*H04W 12/50* (2021.01)
*H04W 12/0471* (2021.01)
*H04M 1/03* (2006.01)
*H04M 1/23* (2006.01)
*H04M 1/737* (2006.01)
*H04W 12/65* (2021.01)

(52) U.S. Cl.
CPC ..... *H04B 10/5563* (2013.01); *H04L 63/0853* (2013.01); *H04W 4/70* (2018.02); *H04W 12/0471* (2021.01); *H04W 12/50* (2021.01); *H04M 1/03* (2013.01); *H04M 1/23* (2013.01); *H04M 1/737* (2013.01); *H04W 12/65* (2021.01)

(58) Field of Classification Search
USPC .............................................................. 726/6
See application file for complete search history.

(56) References Cited

U.S. PATENT DOCUMENTS

| | | | | |
|---|---|---|---|---|
| 10,116,394 | B2* | 10/2018 | Estes | H02S 40/36 |
| 10,243,656 | B2* | 3/2019 | Ji | H04B 10/25752 |
| 2009/0067846 | A1 | 3/2009 | Yu | |
| 2010/0095356 | A1* | 4/2010 | Han | H04L 9/3263 |
| | | | | 726/4 |
| 2015/0121470 | A1* | 4/2015 | Rongo | H04L 63/083 |
| | | | | 726/4 |
| 2015/0223277 | A1* | 8/2015 | Jovicic | H04L 12/437 |
| | | | | 455/41.2 |
| 2016/0112870 | A1 | 4/2016 | Pathuri | |
| 2017/0078026 | A1 | 3/2017 | Brilman | |
| 2017/0094755 | A1 | 3/2017 | Darányi | |
| 2018/0041896 | A1* | 2/2018 | Ji | H04B 10/114 |

FOREIGN PATENT DOCUMENTS

| | | | | |
|---|---|---|---|---|
| EP | 1981183 | A2 | 10/2008 | |
| EP | 3481090 | A1 | 5/2019 | |
| GB | 2427101 | A | 12/2006 | |
| JP | 2009260579 | A | 11/2009 | |
| JP | 2014116871 | A | 6/2014 | |
| JP | 2015023439 | A | 2/2015 | |
| TW | M501462 | U | 5/2015 | |
| TW | M524592 | U | 6/2016 | |
| WO | 2015/011520 | A1 | 1/2015 | |
| WO | WO-2017182343 | A1 * | 10/2017 | G06F 21/33 |

OTHER PUBLICATIONS

Nguyen et al; An SDN-based based Connectivity Control System for Wi-Fi Devices; Jul. 2018; Hindawi Wireless Communications and Mobile Computing; Jul. 2018; pp. 1-11. (Year: 2018).*
Harler et al; Future Tech: Seeing the Light; 2015; Security Info Watch; pp. 1-10. (Year: 2015).*
English machine translation of JP2009260579A published on Nov. 5, 2009 (13 pages).
English machine translation of JP2014116871A published on Jun. 26, 2014 (19 pages).
English machine translation of JP2015023439A published on Feb. 2, 2015 (16 pages).
Dhondge, Kaustubh, et al., "Optical Wireless Authentication for Smart Devices Using an Onboard Ambient Light Sensor," 2014 23rd International Conference on Computer Communication and Networks 2014 (6 pages).
Rosencrance, Linda, "Real world visible light communication applications," https//internetofthingsagenda.techtarget.com/feature/Real-world-visible-light-communication-applications, Oct. 4, 2016 (4 pages).
Tian, Zhao, et al., "Lighting Up the Internet of Things with DarkVLC," Proceeding HotMobile 2016 Proceedings of the 17th International Workshop on Mobile Computing Systems and Applications, pp. 33-38, St. Augustine, Florida, USA, Feb. 23-24, 2016 (6 pages).

* cited by examiner

METHOD, DEVICE AND COMPUTER PROGRAM FOR TRANSMITTING AND OBTAINING NETWORK CREDENTIALS

CROSS-REFERENCE TO RELATED APPLICATIONS

This application is a US 371 Application from PCT/EP2017/084649 filed on Dec. 27, 2017, which claims priority to EP Application 17176710.6 filed on Jun. 19, 2017, the technical disclosures of which are hereby incorporated herein by reference.

TECHNICAL FIELD

The present disclosure relates to method, device and computer program for transmitting and obtaining network credentials.

BACKGROUND

In order for a device to be able to connect to a network it is usually necessary for the device to provide network credentials to the network. In the case of some devices, a user can simply input the network credentials to the device manually and directly, using for example a keyboard which is connected to the device. However, there are many devices that need to connect to a network but which do not have a user interface such as a keyboard or the like.

SUMMARY

According to a first aspect disclosed herein, there is provided a method of transmitting network credentials from a user device to a second device to enable the second device to connect to a network, the method comprising:

at the user device, receiving from a user input of network credentials for the second device to enable the second device to connect to a network; and transmitting modulated light from the user device to the second device, the light being modulated so that the transmitted light is encoded with the network credentials, the second device having a photo sensor for receiving the modulated light from the user device and a processor for processing the modulated light to obtain the network credentials from the received modulated light.

This provides users with a simple way of providing network credentials to a device that needs to connect to a network. This can be less intimidating for users, especially users who may not be technically skilled, and can be particularly convenient for providing network credentials to a device that may be difficult to access.

In an example, the modulation for modulating the light is frequency shift keying. In another example, the modulation for modulating the light is amplitude shift keying.

In an example, the method comprises, at the user device, converting the input network credentials to ASCII American Standard Code for Information Interchange or UTF Unicode Transformation Format format, the light being modulated with the ASCII or UTF format network credentials so that the modulated light that is transmitted is transmitted as a binary bit stream of the network credentials.

In an example, the user device has a keyboard for receiving the input of network credentials by the user typing on the keyboard. The "keyboard" may be provided by for example physical buttons and/or by a touch screen. The keyboard does not have to be a full "QWERTY" keyboard. The keyboard may be specialist, with specific keys or short cuts that are useful for when a user is entering network credentials.

In an example, the user device has a microphone for receiving an audio input of the network credentials from the user.

According to a second aspect disclosed herein, there is provided a user device for transmitting network credentials to a second device to enable the second device to connect to network, the user device comprising:

an input arrangement for enabling a user to input network credentials for a second device to enable the second device to connect to network;

a light source for emitting light; and a modulator for modulating the emitted light with the network credentials;

whereby a user can input network credentials to the user device and the user device can transmit modulated light to the second device to transmit the network credentials to the second device.

According to a third aspect disclosed herein, there is provided a device for connection to a network, the device comprising:

a photo sensor for receiving modulated light transmitted by a user device, the light being modulated so that the transmitted light is encoded with the network credentials for the device;

a processor constructed and arranged to process modulated light received at the photo sensor to obtain network credentials from the received modulated light and to connect the device to a network using the network credentials.

According to a fourth aspect disclosed herein, there is provided a computer program for a user device, the computer program comprising instructions such that when the computer program is executed on a user device, the user device is arranged to:

receive from a user input of network credentials for the second device to enable the second device to connect to a network; and transmit modulated light from the user device to the second device, the light being modulated so that the transmitted light is encoded with the network credentials, the second device having a photo sensor for receiving the modulated light from the user device and a processor for processing the modulated light to obtain the network credentials from the received modulated light.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
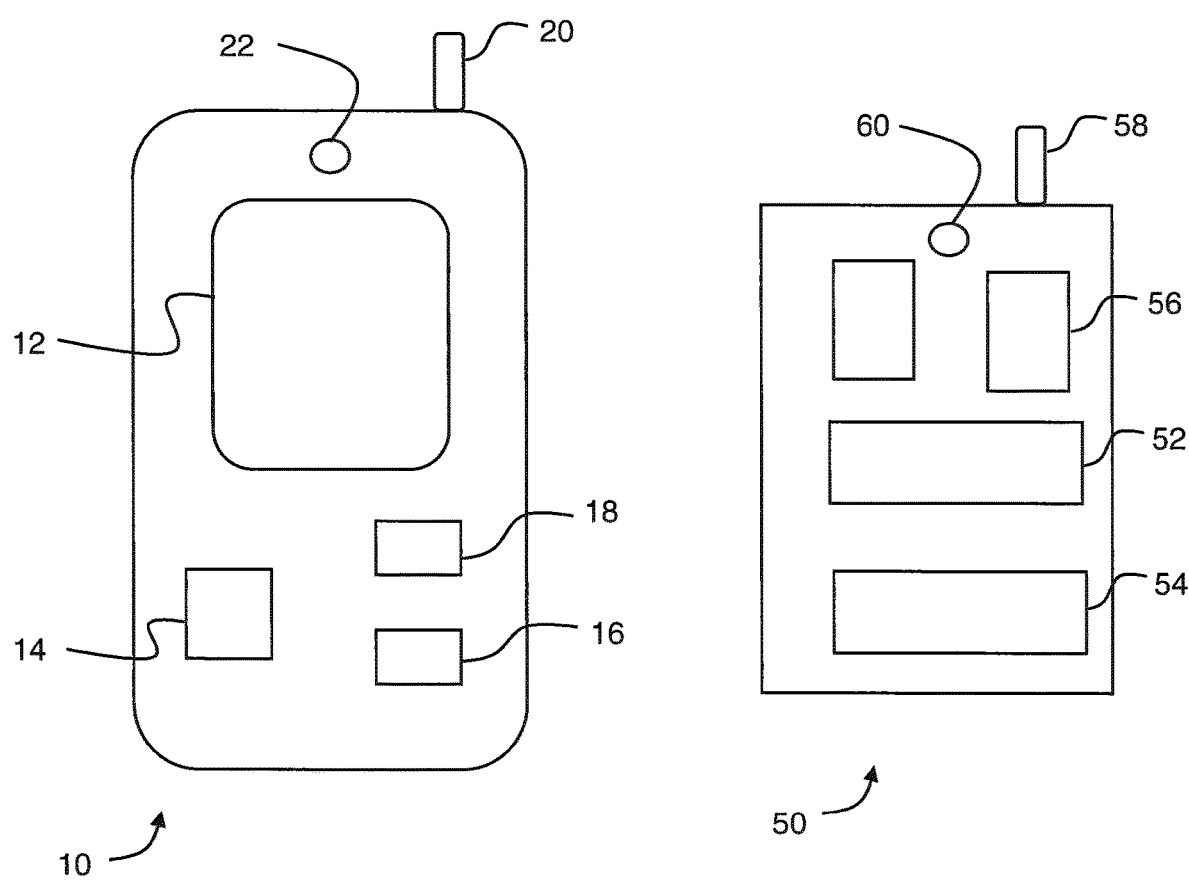
FIG. 1 shows schematically an example of a user device and a device for connection to a network.

There are many devices that need to connect to a network and therefore require network credentials which are passed to the network so that the network can authenticate the device. Many such devices do not have a user interface such as a keyboard or the like which enable a user to enter the network credentials manually and directly. A solution to this is to put the device into AP (Access Point) mode and then use a "captive portal" or similar to connect to the device. However, this is inconvenient for the user. This is a particular problem for devices that are intended as consumer devices as consumers are often not technically minded or technically proficient. Moreover, physical access to the device may be difficult, particularly once it has been fixed in place in a location.

As described herein, in examples a user device transmits network credentials to a second device to enable the second device to connect to a network. A user inputs into the user device network credentials for the second device to enable the second device to connect to a network. The user device then transmits modulated light to the second device, the light being modulated so that the transmitted light is encoded with the network credentials. The second device has a photo sensor for receiving the modulated light from the user device and a processor for processing the modulated light to obtain the network credentials from the received modulated light.

This provides a simple arrangement that enables a user to provide network credentials to a device (the "second device" mentioned above). The user simply has to input the network credentials to the user device and then point the user device at the second device to allow the modulated light, modulated with the network credentials, to be transmitted from the user device to the second device. The second device can demodulate the modulated light that is received to obtain the network credentials. The second device can then connect to the or a network as required, using the network credentials.

The device (the "second device" mentioned above) may be for example a so-called Internet of Things (IoT) device. IoT devices often need to connect at least to a local network, which may for example be a local network in a building, such as a home or an office or factory, etc. The connection may be for example a WiFi or other wireless connection. Alternatively or additionally, IoT devices may need to connect to the Internet, so as to be able to report to or receive commands or data, etc., from some remote central database or controller or the like.

In general, different devices, including IoT devices in particular, have a wide range of functionality, from for example very simple sensors that might report sensed temperatures periodically through to relatively complex devices with a high degree of functionality. For simple devices in particular, there is often no user interface as such, and therefore connecting the device to a network can require relatively complicated technical steps. Even if the device has a user interface that in principle enables a user to interact directly with the device, this can still be intimidating for users who may not be technically proficient. Also, some such devices are located in places that may be difficult for a user to access directly, such as in places that difficult to reach, including for example mounted in a ceiling of a building. Problems such as these are overcome or at least alleviated with examples as described herein.

Referring now to FIG. 1, there is shown schematically an example of a user device 10 and a device 50 for connection to a network.

The user device 10 of this example has a display screen 12, a processor 14 and data storage 16. The processor 14 runs software that provides functionality for the user device 10, including the functionality described herein. The user device 10 of this example is also able to connect wirelessly to one or more networks, including for example a cellular network (such as 2G, 3G, 4G, etc.) and/or a WiFi or other local wireless network. The user device 10 has one or more wireless connectivity modules 18 for this purpose. The user device 10 of this example has one or more antennas 20 for wireless connections. The user device 10 has a light emitter 22. The light emitter 22 may be a laser, such as for example a solid state laser or a semiconductor laser. Alternatively or additionally, the light emitter 22 may be a simple "torch" or "flashlight" (which does not emit coherent light).

The example user device 10 shown is a so-called smartphone or other cellular phone, though other computing devices may be used for this purpose. An advantage of the user device 10 being a smartphone or other cellular phone is that these are familiar to many users and are less likely to be intimidating for the user when used as described herein.

The device 50 for connection to a network has a processor 52 and data storage 54. The device 50 is also able to connect wirelessly to one or more networks, including for example a cellular network (such as 2G, 3G, 4G, etc.) and/or a WiFi or other local wireless network. The device 50 has one or more wireless connectivity modules 56 and one or more antennas 58 for this purpose. The device 50 has one or more power sources 58, which may be one or more batteries, which may be rechargeable or non-rechargeable and alternatively or additionally a connection to a mains electricity supply. The device 50 has a light sensor 60 for detecting light transmitted by the user device 10, as will be discussed further below. The light sensor 60 may be for example a photo-resistor or light-dependent resistor for which typically the electrical resistance decreases with increasing incident light intensity.

The device 50 for connection to a network may be a so-called Internet of Things (IoT) device. In general, as used herein, an IoT device is a device that has an addressable interface (e.g. an Internet protocol (IP) address, a Bluetooth identifier (ID), a near-field communication (NFC) ID, etc.) and can transmit information to one or more other devices over a wired or wireless connection. IoT devices may in general include or be incorporated in for example refrigerators, ovens, microwaves, freezers, dishwashers, clothes washing machines, clothes dryers, furnaces, air conditioners, thermostats, televisions and other consumer electronic devices, light fixtures, vacuum cleaners, sprinklers, electricity meters, gas meters, etc.

In order for the device 50 to connect to a network, the device 50 requires network credentials. The precise network credentials and their format that are required will typically depend on the nature of the network and any accessibility requirements to allow a connection to the network to be made. As a generality, the network credentials will include some identifier of the network to which the device 50 will connect and some password or passphrase which is required in order for the connection to be authenticated. As a specific example, in the case of a wireless local area network (WLAN), network credentials will include an SSD) (Service Set Identifier) and a password or passphrase. A service set identifier (SSID) is a sequence of characters that names a wireless local area network (WLAN).

The user has to provide the network credentials for the network to the device 50. In the present case, this is achieved as follows.

The user device 10 has software, which may be downloaded by the user as an "app", that enables the user to input the required network credentials and that then modulates light emitted by the light emitter 20 according to the network credentials so that the modulated light is effectively encoded with the network credentials. The network credentials may be input into the user device 10 by the user using a keyboard (which may be keyboard with moving keys or a touchscreen of the user device 10, etc.). Alternatively or additionally, the software running on the user device 10 may allow a user to speak the network credentials into a microphone of the user device 10 and then carries out a conversion in effect to convert the received audio to text.

Once the network credentials have been input into the user device 10 and the user is ready for the network credentials to be transmitted to the device 50, the software running on the user device 10 causes light emitted by the light emitter 22 to be modulated so as to encode the light with the network credentials, and to do so in a form that can be demodulated by the device 50. This may be initiated by for example the user providing some input to the user device 10. The user points the user device 10 towards the device 50 so that the emitted light is incident on the light sensor 60 of the device 50.

On receiving the light, the device 50 demodulates the received light so as to extract the network credentials. The device 50 is then able to connect to a network (i.e. the network for which the network credentials have been obtained), providing the network credentials to the network as required. The device 50 may be arranged to connect to the network immediately and autonomously once sufficient network credentials have been obtained. Alternatively or additionally, after having caused the network credentials to be transmitted to the device 50, the user may then send a command to the device 50, optionally by using an appropriately modulated light beam emitted by the user device 10, to cause the device 50 to connect to the network using the network credentials.

This provides users with a very simple and intuitive arrangement for passing network credentials to a device that needs to connect to a network. From the user's point of view, as a minimum all they need to is run an app on a user device, enter network credentials into the user device (for example, when prompted), and then point the user device at the device that needs to connect to a network so that light modulated with the network credentials and emitted by the user device can be received by the device that needs to connect to a network.

Figure 2:
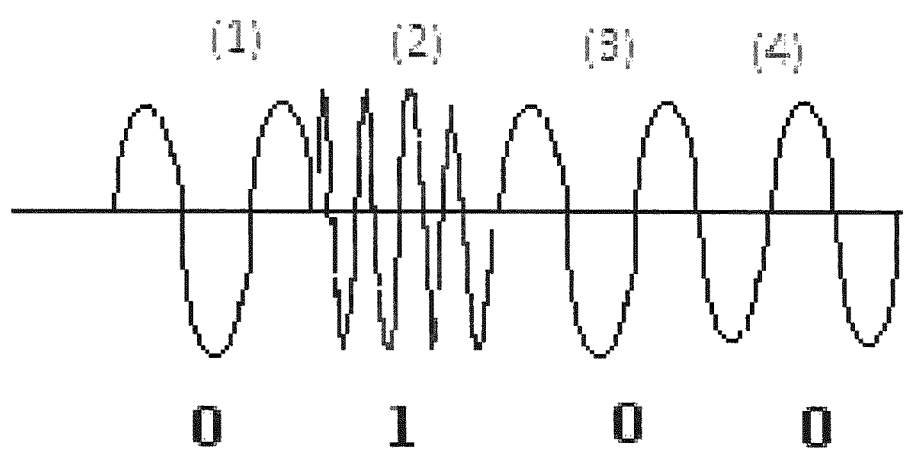
FIG. 2 shows schematically an example of modulation of light.

In general, a number of different modulation techniques may be used for modulating the light beam emitted by the user device 10. A particularly useful technique is FSK (Frequency Shift Keying). FIG. 2 shows schematically an example of modulation of light using FSK. In short, discrete frequency changes are used to signify that a digital 1 (one) or a digital 0 (zero) is being transmitted. In the example shown, low frequency bursts are used to indicate a 0 and high frequency bursts are used to indicate a 1 (and so, in this example, a 0 is followed by a 1 which is then followed by two 0s, as indicated by a low frequency burst being followed by a high frequency burst and then two (contiguous) low frequency bursts. Other arrangements are of course possible.

As an alternative to FSK, ASK (Amplitude Shift Keying) may be used, particularly for user devices 10 in which the intensity of the light that is emitted may be controlled. ASK in this context is advantageous as it can enable the transfer speed to be greater.

For the actual form of the network credentials that are modulated onto the light, a number of options are available. The software running on the user device 10 may for example convert the network credentials that are input by the user to ASCII (American Standard Code for Information Interchange) or UTF (Unicode Transformation Format) format, which is then converted to binary format for encoding the light that is transmitted.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors and a digital signal processor or processors, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of transmitting network credentials from a user device to a second device to enable the second device to connect to a network, the method comprising:
    at the user device, receiving from a user input of network credentials for the second device to enable the second device to connect to the network; and
    transmitting modulated light from the user device to the second device, the light being modulated so that the transmitted light is encoded with the network credentials, the second device having a photo sensor for receiving the modulated light from the user device and a processor for processing the modulated light to obtain the network credentials from the received modulated light.

2. The method according to claim 1, wherein the modulation for modulating the light is frequency shift keying.

3. The method according to claim 1, wherein the modulation for modulating the light is amplitude shift keying.

4. The method according to claim 1, further comprising, converting, at the user device, the input network credentials to American Standard Code for Information Interchange (ASCII) or Unicode Transformation Format (UTF), the light being modulated with the ASCII or UTF format network credentials so that the modulated light that is transmitted is transmitted as a binary bit stream of the network credentials.

5. The method according to claim 1, further comprising: receiving, at a keyboard of the user device, the input of the network credentials by the user typing on the keyboard.

6. The method according to claim 1, further comprising: receiving, at a microphone of the user device, an audio input of the network credentials from the user.

7. A user device for transmitting network credentials to a second device to enable the second device to connect to a network, the user device comprising:

an input arrangement for enabling a user to input the network credentials for the second device to enable the second device to connect to the network;

a light source; and a modulator for modulating light, emitted from the light source, with the network credentials;

whereby the user can input the network credentials to the user device and the user device can transmit modulated light to the second device to transmit the network credentials to the second device.

8. The user device according to claim 7, wherein the modulator is arranged to modulate the light using frequency shift keying.

9. The user device according to claim 7, wherein the modulator is arranged to modulate the light using amplitude shift keying.

10. The user device according to claim 7, wherein the user device is constructed and arranged to convert the input network credentials to American Standard Code for Information Interchange (ASCII) or Unicode Transformation Format (UTF), the modulator being arranged to modulate the light with the ASCII or UTF format network credentials so that the modulated light that is transmitted is transmitted as a binary bit stream of the network credentials.

11. The user device according to claim 7, comprising a keyboard for receiving the input of the network credentials by the user typing on the keyboard.

12. The user device according to claim 7, comprising a microphone for receiving an audio input of the network credentials from the user.

13. A non-transitory computer-readable memory device storing a computer program for a user device, the computer program comprising instructions such that when the computer program is executed on the user device, the user device is configured to:

receive from a user input of network credentials for a second device to enable the second device to connect to a network; and transmit modulated light from the user device to the second device, the light being modulated so that the transmitted light is encoded with the network credentials, the second device having a photo sensor for receiving the modulated light from the user device and a processor for processing the modulated light to obtain the network credentials from the received modulated light.

* * * * *